(12) United States Patent
Brust et al.

(10) Patent No.: US 9,631,737 B2
(45) Date of Patent: Apr. 25, 2017

(54) SOLENOID VALVE, BATTERY OF SOLENOID VALVES, METHOD OF MANUFACTURING A SOLENOID VALVE, AND MOLD

(71) Applicant: Bürkert Werke GmbH, Ingelfingen (DE)

(72) Inventors: Claus Brust, Schrozberg (DE); Simone Knauβ, Langenbrettach (DE); Rainer Künzler, Künzelsau (DE); Ralf Scheibe, Künzelsau (DE)

(73) Assignee: Burket Werke GmbH (DE)

( * ) Notice: Subject to any disclaimer, the term of this patent is extended or adjusted under 35 U.S.C. 154(b) by 96 days.

(21) Appl. No.: 14/242,926

(22) Filed: Apr. 2, 2014

(65) Prior Publication Data

US 2014/0299802 A1    Oct. 9, 2014

(30) Foreign Application Priority Data

Apr. 3, 2013    (DE) .................. 20 2013 003 049

(51) Int. Cl.
   *F16K 31/06*    (2006.01)
   *H01F 7/14*    (2006.01)
   (Continued)

(52) U.S. Cl.
   CPC ........ *F16K 31/0682* (2013.01); *F16K 27/003* (2013.01); *F16K 27/029* (2013.01);
   (Continued)

(58) Field of Classification Search
   CPC ............. F16K 31/0682; F16K 31/0627; F16K 27/003; F16K 27/029; Y10T 137/86847;
   (Continued)

(56) References Cited

U.S. PATENT DOCUMENTS 3,570,807 A * 3/1971 Sturman ............. F16K 31/0682
                                              251/129.17
4,390,130 A * 6/1983 Linssen ................ F02M 51/065
                                              239/585.3
(Continued)

FOREIGN PATENT DOCUMENTS

CN    101432558 A    5/2009
DE    2948874 A1    6/1981
(Continued)

OTHER PUBLICATIONS

German Search Report dated Nov. 21, 2013 in German Patent Application No. 20 2013 003 049.6.
(Continued)

*Primary Examiner* — Mary McManmon
*Assistant Examiner* — David Colon Morales
(74) *Attorney, Agent, or Firm* — Plumsea Law Group, LLC

(57) ABSTRACT

In a solenoid valve having a magnetic drive including a housing which is at least partly formed from an injection molding compound, the magnetic drive includes a magnet coil having a winding, a magnet yoke, and a movably mounted magnet armature which is arranged outside the magnet coil. The housing has a first section which encloses the magnet coil having the winding and the magnet yoke, and the housing has a second section which encloses at least most of the movably mounted magnet armature. Further proposed are a battery having a plurality of solenoid valves, a method of manufacturing a solenoid valve, and a mold.

14 Claims, 5 Drawing Sheets

(51) Int. Cl.
*F16K 27/00* (2006.01)
*F16K 27/02* (2006.01)
*H01F 7/16* (2006.01)
*F16K 31/08* (2006.01)
*F15B 13/08* (2006.01)

(52) U.S. Cl.
CPC ........ *F16K 31/0627* (2013.01); *F16K 31/082* (2013.01); *H01F 7/14* (2013.01); *H01F 7/1638* (2013.01); *F15B 13/0839* (2013.01); *F15B 13/0846* (2013.01); *Y10T 29/49075* (2015.01); *Y10T 137/86847* (2015.04)

(58) Field of Classification Search
CPC ....... Y10T 137/86493; Y10T 29/49075; H01F 7/1638; H01F 7/16; H01F 7/17; H01F 7/14; F15B 13/0846; F15B 13/0839
See application file for complete search history.

(56) References Cited

U.S. PATENT DOCUMENTS

| | | | | |
|---|---|---|---|---|
| 4,534,381 A * | 8/1985 | Hozumi | ............. | F16K 31/0682 137/625.65 |
| 4,564,046 A * | 1/1986 | Lungu | ................ | F16K 31/082 137/625.65 |
| 4,759,528 A * | 7/1988 | Morris | ................ | H01F 7/1638 251/129.06 |
| 4,889,314 A * | 12/1989 | Hashizume | ............ | H01F 7/08 251/129.02 |
| 4,922,965 A * | 5/1990 | Meister | ............ | F16K 31/0606 137/625.65 |
| 4,944,487 A * | 7/1990 | Holtermann | ........... | F16K 31/06 251/129.17 |
| 5,040,567 A * | 8/1991 | Nestler | ................ | F16K 11/04 137/625.44 |
| 5,139,226 A * | 8/1992 | Baldwin | ............ | F16K 31/0682 137/625.44 |
| 5,538,220 A * | 7/1996 | LaMarca | ................ | H01F 7/08 251/129.15 |
| 5,653,422 A | 8/1997 | Pieloth et al. | | |
| 5,709,370 A * | 1/1998 | Kah, Jr. | ............. | F16K 31/0682 251/129.15 |
| 5,711,346 A * | 1/1998 | Pieloth | ............... | F16K 31/0682 137/625.44 |
| 5,762,097 A * | 6/1998 | Hettinger | ............ | F16K 31/0682 137/270 |
| 5,773,038 A * | 6/1998 | Hettinga | ................ | B29C 45/26 264/297.2 |
| 5,799,696 A * | 9/1998 | Weiss | .................... | F16K 11/052 137/625.44 |
| 5,918,635 A * | 7/1999 | Wang | .................. | F16K 31/0693 137/625.65 |
| 5,983,941 A * | 11/1999 | Fritz | .................... | F16K 11/052 137/625.44 |
| 6,145,806 A * | 11/2000 | Dettmann | ............... | F16K 31/06 137/625.44 |
| 6,161,539 A * | 12/2000 | Winter | .................. | A61M 16/20 128/205.24 |
| 6,203,146 B1* | 3/2001 | Pawlowksi, Jr. | .... | B41J 2/17509 347/85 |
| 6,435,848 B1* | 8/2002 | Minami | ............. | F04B 27/1804 137/514.5 |
| 6,726,173 B2* | 4/2004 | Hettinger | ............ | F16K 31/0682 251/129.17 |
| 6,772,919 B2* | 8/2004 | Magri | .................. | B67D 1/0085 222/504 |
| 6,955,332 B2* | 10/2005 | Kees | .................... | F16K 31/0682 251/129.01 |
| 7,637,443 B2* | 12/2009 | Scheffel | ............... | F02M 51/005 239/585.1 |
| 7,701,314 B2* | 4/2010 | Hazzard | .................. | H01F 7/128 335/241 |
| 7,888,450 B2* | 2/2011 | Uehira | ................ | C08G 63/605 528/206 |
| 2004/0244856 A1* | 12/2004 | Schauz | ............. | F15B 13/0821 137/884 |
| 2007/0287926 A1* | 12/2007 | Nunome | ............. | A61B 5/0235 600/498 |
| 2008/0179553 A1* | 7/2008 | Walter | ................ | F16K 31/0682 251/65 |
| 2009/0314975 A1* | 12/2009 | Scheibe | ................ | F16K 11/044 251/129.15 |
| 2010/0038571 A1* | 2/2010 | Frank | ...................... | B60T 8/327 251/129.15 |
| 2010/0038572 A1* | 2/2010 | Alvarez | ............. | F16K 31/0682 251/129.15 |
| 2011/0155936 A1* | 6/2011 | Ellwein | ................... | H01F 7/081 251/129.15 |

FOREIGN PATENT DOCUMENTS

| | | |
|---|---|---|
| DE | 4432588 C2 | 3/1996 |
| DE | 19505233 C2 | 8/1996 |
| DE | 20100471 U1 | 3/2001 |

OTHER PUBLICATIONS

Chinese Office Action dated Feb. 3, 2016 in Chinese Patent Application No. 201410134758.4.
Chinese Office Action issued Oct. 19, 2016 for CN Application No. 201410134758.4.

* cited by examiner

SOLENOID VALVE, BATTERY OF SOLENOID VALVES, METHOD OF MANUFACTURING A SOLENOID VALVE, AND MOLD

FIELD OF THE INVENTION

The present invention relates to a solenoid valve including a magnetic drive having a housing formed from an injection molding compound, as well as to a battery of solenoid valves, a method of manufacturing a solenoid valve, and a mold.

TECHNICAL BACKGROUND

Magnetic drives are made use of in solenoid valves in order to drive them appropriately. Typically, such a magnetic drive includes a magnet armature and a magnet coil cooperating therewith. In the most widely used form, the magnetic drives are based on so-called lifting armatures, in which the armature is arranged within the coil which, in turn, is surrounded by a housing. However, solenoid valves having a drive with a lifting armature are unsuitable for some applications because the dimensions of the housing are too large.

In a different design type, the armature is arranged outside the coil. The coil and the armature are then usually surrounded by two separate housings: the armature housing and the coil housing. The coil housing is typically realized by insert molding or pressure coating with a plastic material to protect the coil from any harmful external influences. The armature housing is frequently composed of two housings which enclose the armature in such a manner that it is movably mounted therein. The two housings, i.e. the armature housing and the coil housing, are then typically connected with each other to form a unit.

The external dimensions of the housing of this type of design, however, are still too large for many applications. This primarily applies to ever advancing miniaturizations, for example when a large number of solenoid valves are fitted together to form a battery.

DESCRIPTION

It is therefore the object of the invention to provide a solenoid valve and a method of manufacturing a solenoid valve which includes a magnetic drive having a space-saving and very compact design. It is a further object of the invention to provide a battery of solenoid valves which allows solenoid valves to be arranged in as tight an in-line array as possible.

According to one aspect of the invention, provision is made for a solenoid valve including a magnetic drive having a housing which is at least partly formed by an injection molding compound. The magnetic drive comprises a magnet coil including a winding, a magnet yoke, and a magnet armature. The magnet armature is arranged outside the magnet coil (therefore no lifting armature is involved). The magnet armature is movably mounted. The housing may surround part of or most of the magnet coil, the magnet yoke, and the magnet armature. The housing (injection molded housing) is preferably a one-piece housing and is formed mainly or entirely from an injection molding compound (which is, of course, in a cured condition in its final state). The housing may have an opening which is closed with a cover.

In the context of the present description, the terms "injection molding compound" and "insert molding" relate to injection molding (often also referred to as injection molding method). This is a primary forming process which is mainly employed in plastics processing. This method allows molded parts to be produced, such as, e.g., the housing of the solenoid valve or of the magnetic drive according to aspects of the invention. To this end, an injection molding machine is used for plasticizing (liquefying) the respective material, in most cases a plastic material, in an injection unit and injecting it into an injection mold. The cavity of the mold determines the shape and the surface structure of the finished part. Suitable plastic materials are, more particularly, thermoplastic polymers. In the context of the present description of the invention, with respect to the injection molded housing according to aspects of the invention, the term "injection molding compound" should be understood to the effect that the already cured injection molding compound or a cured plastic material (including thermoplastic polymers, if applicable) is involved which was used for manufacturing the housing in the injection molding method.

The magnet coil and the magnet yoke may advantageously be surrounded by the housing made from injection molding compound such that a first section for the magnet coil and the magnet yoke is provided in the housing. The housing may have a second section for receiving the magnet armature. The second section of the housing may advantageously be configured such that the magnet armature can be inserted into the second section. The magnet armature is movably mounted in the second section.

The second section is advantageously configured such that the magnet armature has the necessary free play which it requires for operation. To this end, the second section preferably includes an appropriate cavity in which the magnet armature is arranged.

According to the preceding aspects of the invention, provision is made for a housing for the magnetic drive of a solenoid valve, which can be manufactured in one single method step (injection molding method). In addition, it is achieved that the magnet coil is surrounded by only one wall, as a result of which the magnetic drive has a correspondingly space-saving design.

In the present context, the height of the housing is the dimension determining the structural size of the magnetic drive or of the solenoid valve. The configuration of the housing according to aspects of the invention and the associated desired reduction in height, that is, the dimension determining the structural size, allows to achieve a space-saving structure of the solenoid valve.

Advantageously, the second section may have an opening. This opening may serve to insert the magnet armature into the second section or the cavity in the second section after completion of the housing.

The opening may be provided in that one of the six possible walls (four side walls, one bottom wall and one cover wall) is only partly or not at all formed by the injection molding compound. Advantageously, only the cover wall (or bottom wall, depending on the angle of view) may be absent. The second section then essentially has a bottom wall and four side walls, one of the side walls (in the present context the "fourth" side wall) being formed by the first section of the housing, where the magnet coil, which is completely surrounded by the injection molding compound, and the magnet yoke are located, which is surrounded by injection molding compound except for the pole faces. In other words, the cavity in the second section may advantageously remain open on one side in the injection molding process.

In particular, the pole faces of the magnet yoke may then advantageously also be located within the fourth side wall of the second section.

Advantageously, the pole faces are not covered by the injection molding compound. This would impair the operation of the magnetic drive.

The second section of the housing is advantageously of a cup-shaped or trough-shaped design. This means that the second section of the housing constitutes an accommodation for the magnet armature. The cup or trough shape implies that a cavity is present here which, at least on one side, is not closed by a wall made from injection molding compound.

To close the second section (sealing the cavity for the magnet armature all around), provision may be made for a cover which is connected to the housing and appropriately sealingly closes it. This cover here replaces the cover wall of the second section which is not provided by the injection molding compound.

The cover may be adhesively bonded to the housing here, so that a stable connection is produced.

Alternatively, the cover may be ultrasonically welded to the housing.

The cover may exhibit slopes or grooves or flutes. The housing may exhibit complementary grooves or flutes or slopes which cooperate with the slopes or grooves or flutes of the cover.

The plastic housing wall formed by the hardened injection molding compound may advantageously have a thickness of only 0.25 mm to 0.3 mm, as a result of which the space required by the entire housing and, therefore, the space required by the entire magnetic drive can be correspondingly reduced due to the small wall thickness. The wall thickness may denote the minimum thickness of the injection molding compound here by which it covers the magnet coil and the magnet yoke all around (except for the pole faces, which are intended to remain largely uncovered).

The cover may likewise advantageously have a wall thickness of only 0.25 mm to 0.3 mm.

The second section of the housing for the magnet armature may be arranged laterally next to the magnet coil. This offers the advantage of a particularly compact embodiment.

As an alternative, the second section for the magnet armature may also be arranged below or above the magnet coil. The arrangement of the second section is dependent on the coil geometry and may be adjusted appropriately.

The housing may feature an inwardly facing raised portion which is arranged on an inside wall of the housing. The raised portion may increase the thickness of the wall in this area. This inwardly facing raised portion may serve as a flow aid in manufacturing the housing. This can make sure that the injection molding compound flows evenly around the magnet coil from all sides and, ultimately, the magnet coil is thus uniformly surrounded by it. The uniform encasing of the magnet coil in injection molding compound ensures that the magnet coil is surrounded by a sufficient wall thickness on all sides. In particular, in this way the magnet coil can be prevented from being incompletely surrounded by the injection molding compound.

The raised portion is advantageously arranged in the region of the second section and is advantageously provided there in the form of an inwardly directed raised portion (that is, facing the cavity).

The raised portion has the shape of a cuboid, for example, and corresponds to a groove in the mold. The flow cross-section is determined by the height and width of the raised portion or of the groove in the mold.

Depending on how the magnet coil and the magnet armature are arranged in relation to each other and how and from where the injection molding compound is injected into the mold for producing the housing, different arrangements and geometries of flow aids or raised portions in the finished housing come into consideration. Providing a flow aid according to aspects of the invention (that is, one or more suitable raised portions in the finished housing) solves the problem of providing, in one injection molding process, a housing which includes a first section in which the coil is arranged and surrounded as uniformly as possible and, at the same time, a second section in which the movable armature is arranged, for which purpose a cavity is formed here. The injection molding compound can not flow sufficiently well in the region of the walls surrounding this cavity, especially when the housing has small dimensions (thin walls). This may lead to the fact that in particular the magnet coil in the first section is not sufficiently covered.

The inwardly facing raised portion (flow aid) may advantageously extend over one wall (e.g., the bottom wall) of the cavity of the second section. The raised portion (flow aid) may advantageously extend over the entire width of the cavity of the second section. This means that the raised portion or flow aid extends from a side wall of the second section of the housing as far as to the first section of the housing. Advantageously, this side wall is the one which is opposite the first section. Located in the first section are the magnet coil and the magnet yoke. In particular, injection molding material can in this way be completely and uniformly injected around the magnet coil. This is especially advantageous since in the region of the cavity of the second section, the injection molding compound can flow only in the area of the comparatively thin walls (e.g., the bottom wall) and a uniform distribution of the injection molding compound is thereby made more difficult. To eliminate this problem, provision is made for a flow aid in the mold, which ultimately becomes manifest in the form of a raised portion in the housing.

The cross-sectional area of the raised portion is advantageously selected such that an optimum distribution of the injection molding compound is ensured. In other words, the flow cross-section of the flow aid is selected such that it is ensured that the magnet coil (and also the magnet yoke, except for the pole faces) are completely and with a uniform wall thickness surrounded by the injection molding compound.

According to a further aspect of the invention, the magnet armature includes two pole pieces and the housing includes an injection molded section in the first section. This injection molded section is arranged such that it is bordered by the pole pieces and the winding of the magnet coil and fills the area bordered by the pole pieces and the winding.

One end of the raised portion serving as the flow aid then advantageously rests against the injection molded section (opens into it). Further, another end of the raised portion serving as the flow aid may then rest against a wall of the cavity (may open into the wall).

The injection molded section advantageously has the height of the housing. In other words, it fills the (substantially cuboid) area bordered by the coil winding and the pole pieces to its full height.

The raised portion serving as the flow aid then advantageously has a cross-sectional area (a flow cross-section) which is selected such that the injection molded section can fully form during the injection molding process.

The magnet armature may be swivel-mounted within the cavity of the second section of the housing.

The magnet armature may cooperate with an actuating member, the magnet armature being shifted when the magnet coil is in the activated condition, so that the magnet armature actuates the actuating member.

The magnet armature may have an L-shaped configuration, the magnet armature having one shorter and one longer leg.

The shorter leg of the magnet armature then advantageously cooperates with the actuating member.

Advantageously, the end of the longer leg of the magnet armature pointing away from the shorter leg of the magnet armature contacts the pole face of the magnet yoke.

The actuating member may have a sealing element provided thereon, which serves to close a valve seat. In this way, the magnet armature may open or close a valve seat by means of the actuating member.

As discussed above, the injection molding compound which is used for the housing may preferably be a thermoplastic material. Therefore, the housing may be manufactured in an injection molding process, with the first section for the magnet coil and the magnet yoke and the second section for the magnet armature being manufactured at the same time, that is, in one method step of the injection molding method. The first and second sections then form a one-piece injection molded housing, which may be closed with a cover only in the region of the second section, if required.

The injection molding compound used may be a material having a high flowability in order to ensure that the complex structure of the housing can be injection molded. The high flowability is necessary for realizing raised portions provided on the housing.

The high flowability of the injection molding compound, in conjunction with the inwardly facing raised portion which serves as the flow aid, constitute an optimum combination to produce the housing consisting of the first and second sections.

A suitable material for the injection molding compound is, for example, a liquid crystal polymer (LCP) since this material has a high flowability and is accordingly well suited to form the housing.

The injection molding compound used for manufacturing the housing may partly penetrate into the winding of the magnet coil if the injection molding compound is a plastic material that flows well. This may improve the resistance to interference.

The dimensions of the housing of the solenoid valve may in particular be such that the length and width of the housing are larger than the height. The height corresponds to the so-called grid dimension of solenoid valves when they are arranged in batteries. The height may be equal to or less than 9 mm. The height may advantageously amount to 4.5 mm or less. The height may advantageously be in a range of between 2.5 mm and 5 mm.

The invention further provides a battery of solenoid valves, one or more of which include(s) a magnetic drive having a housing in accordance with the preceding aspects.

The battery of solenoid valves in accordance with aspects of the present invention may advantageously contain 8, 16 or 32 solenoid valves. The solenoid valves advantageously are each fitted to each other such that a first side of a first solenoid valve on which the bottom wall of the second section (and also of the first section) is located comes to rest against a second side of a second solenoid valve on the side opposite to the bottom wall of the second section. In other words, the solenoid valves are arranged side by side, respective opposite sides of the solenoid valves resting against each other.

According to one aspect of the invention, the opening of the cavity of at least one solenoid valve may be closed by a side wall of an adjacent solenoid valve. This means that within a battery, the second sides of the solenoid valves (i.e. for example the sides where the respective opening of the second section of the housing is arranged) may initially remain open (that is, without a cover). The opening or the cavity in which the armature is located is then only closed by the first side of the respectively adjacent solenoid valve. Only the last, or first, (depending on the viewing angle) solenoid valve then possibly still requires a cover for closing the opening of the second section of the housing. This measure may save even more space.

The invention also provides a method of manufacturing a magnetic drive. First, a magnet yoke and a magnet coil are placed in an injection mold which has an appropriate profile for manufacturing the housing.

In a next step, the injection molding compound is injected into the injection mold, so that the first section for the magnet yoke and the magnet coil is encased in the injection molding material, with the second section having the cavity for the magnet armature being formed at the same time.

After the injection molding of the housing has been completed, the magnet armature and the further components, for instance springs, are inserted into the second section.

Finally, the second section may be closed with a cover.

The inwardly facing raised portion which is provided and which serves as a flow aid allows the magnet coil to be uniformly encased by the injection molding compound being injected, so that a sufficient wall thickness is produced all around.

The winding of the coil and the pole pieces of the magnet yoke are covered to their full height in particular in the region of the injection molded section described above.

In other words, the invention provides, inter alia, a method of manufacturing a solenoid valve. The housing is manufactured from an injection molding compound in accordance with an injection molding method. A first section of the housing, in which a magnet coil and a magnet yoke are arranged, and a second section of the housing are formed using the injection molding compound, such that a cavity for receiving a movably mounted magnet armature is formed. Then the injection molding compound is cured. Finally, the magnet armature can be inserted into the cavity of the second section, so that it is movably mounted there. Forming the first section and forming the second section are preferably effected in the same injection process.

The invention further provides a mold configured to provide in an injection molding method the housing for the solenoid valve or for the magnetic drive according to aspects of the invention.

Furthermore, the invention makes provision that manufacturing the housing having the first section and the second section is effected with a mold which is configured to form the housing having the first section and the second section from the injection molding compound.

The mold advantageously includes a groove which serves as a flow aid. This groove corresponds to the raised portion in the finished housing.

Further aspects of the method and of the mold will be apparent from the above description of the solenoid valve according to aspects of the invention.

DESCRIPTION OF THE DRAWING FIGURES

The features and aspects of the invention will now be described in more detail below by means of an exemplary embodiment and with reference to the drawing figures, in which.

DETAILED DESCRIPTION

Figure 1:
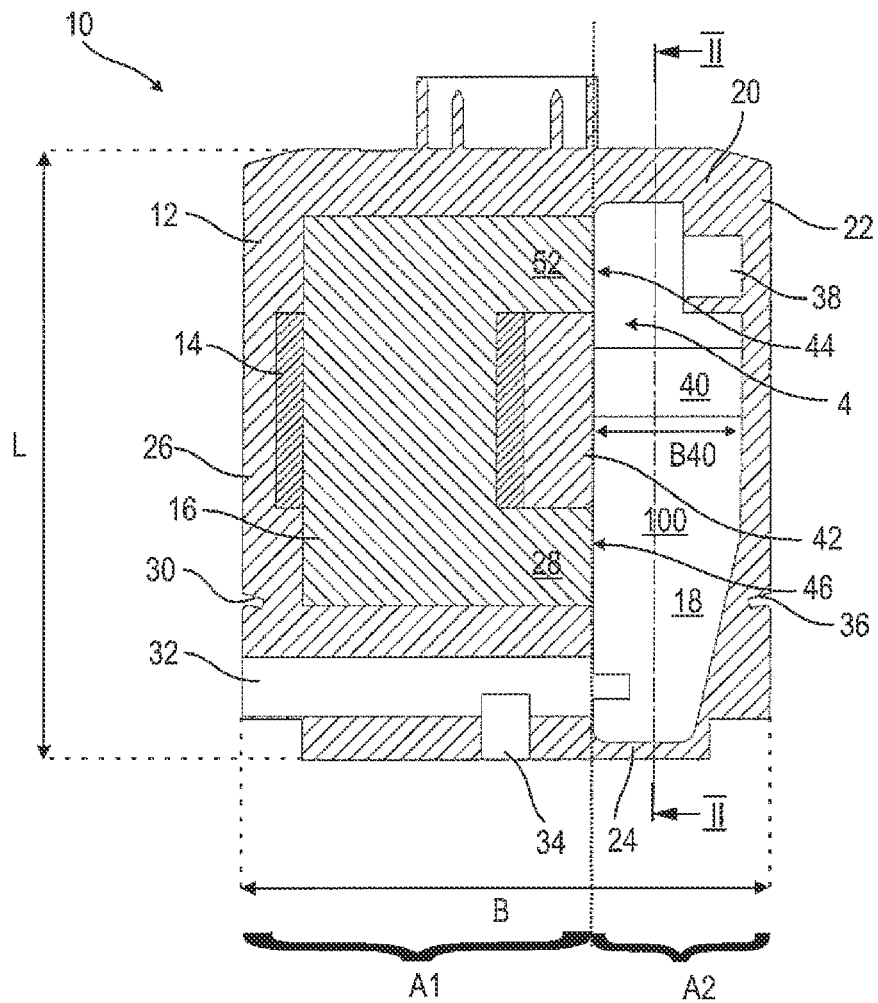
FIG. 1 shows a cross-sectional view of the housing of a magnetic drive for a solenoid valve according to an exemplary embodiment of the invention, after the first manufacturing step.

FIG. 1 shows a cross-section of the solenoid valve according to the invention with a magnetic drive 10 after a first manufacturing step. The magnetic drive 10 is shown after the first method step, in which the housing 12 was manufactured in an injection molding method step with a first section A1 having the magnet coil 14 and the magnet yoke 16 and a second section A2 for the magnet armature (not shown). Accordingly, all of the components of the housing that are shown are produced from an injection molding compound, except for the magnet coil 14 and the magnet yoke 16. In particular, these components are produced from an injection molding compound in one step of an injection molding method.

Accordingly, the housing 12 essentially comprises the first section A1 and the second section A2. The second section A2 has a bottom surface 18 (which, by the way, also extends over the entire first region A1), from which the side walls of the housing 12 extend substantially perpendicularly (that is, toward the observer). The second section A2 has a cavity 100 which is open toward the observer. The cavity 100 is surrounded by a first side wall 20 which is arranged at the upper end of the housing 12. Viewed clockwise, a second side wall 22 extends perpendicularly to the first side wall 20. Provided opposite the first side wall 20 of the housing 12 is a third side wall 24 which extends as far as into the second section A2 and cooperates with a fluid housing (not illustrated here). The fourth side wall 4 of the cavity 100 is provided by the first section A1, in which the magnet coil 14, which is fully encased in injection molding material, and the magnet yoke 16 are located. A further outer wall 26 is provided by the second section.

The first section A1 of the housing 12 is thus completely encased in injection molding material and contains the magnet coil 14 and the magnet yoke 16, which are almost completely surrounded by the injection molding compound. Only the pole faces 44 and 46 of the magnet yoke 16 are not covered by injection molding compound.

The housing 12 further includes a second section A2 which, in the embodiment shown, is situated between an outer surface of the second side wall 22 and the first section A1. This second section A2 serves to receive a magnet armature, which has not yet been inserted here.

As is clearly apparent from FIG. 1, the injection molded housing 12 has a complex structure since the walls 20 to 26 are provided with various recesses and indentations, so that a plastic material that flows well can be used as the injection molding compound for the manufacture of the housing 12.

For example, a first indentation 30 and a plug receiving portion 32 are formed in the outer wall 26 of the housing 12. The plug receiving portion 32 is located between the side wall 26 and the side wall 24, with an actuating channel 24 being also formed along the side wall 24, the actuating channel 24 serving to receive an actuating member which is not yet inserted. The second side wall 22 further includes a second indentation 36 on the outside and a spring seat 38 in the area of the cavity 100.

The second side wall 22 further has an inwardly directed raised portion 40 provided thereon which functions as a flow aid. The raised portion 40 extends along the bottom surface 18 of the second section A2. The raised portion 40 extends over the entire width B40 of the cavity 100.

The raised portion, or flow aid, 40 serves to appropriately distribute the injection molding compound when the housing 12 is injection molded, so that a uniform injection molding around the magnet coil 14 is obtained. The raised portion or flow aid 40 allows a complete injection molded section 42 to be produced between the winding of the magnet coil 14 and the pole pieces (also magnet yoke legs) 28 and 52 of the magnet yoke 16 relatively centrally within the housing 12.

The injection molded section 42 directly engages the magnet coil 14 (there is also a complete flow around magnet coil 14 here), fills the space between the pole pieces (also magnet yoke legs) 28 and 52, and terminates flush with the pole faces 44, 46 of the magnet yoke 16.

The pole faces 44, 46 are facing the cavity 100 of the second section A2. Together with the winding section 42 encased in injection molding material, the two pole faces 44, 46 form a flush edge which faces the second section A2 and forms the fourth side wall for the cavity 100 of the second section A2.

The flow cross-section QF of the flow aid or the cross-section of the raised portion 40 is selected such that the magnet coil 14 is fully surrounded by the injection molding compound, in particular also in the area of the injection molded section 42.

In addition, the injection molded section 42 has the same height as the side walls 20 to 26 of the housing 12.

Figure 2:
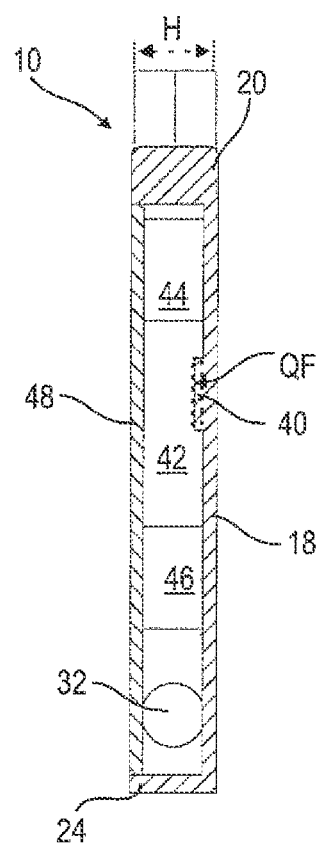
FIG. 2 shows a longitudinal section taken along line II of FIG. 1, with a cover.

The height H of the housing 12 as well as further features regarding the second section A2 are apparent from FIG. 2, which is a longitudinal section taken along line II shown in FIG. 1.

FIG. 2 shows the housing 12 in a longitudinal section, with a cover 48 being now shown which closes the cup-shaped section A2. The cover 48 may be glued to the housing 12 or may be attached thereto by means of ultrasonic welding.

FIG. 2 further clearly shows the two pole faces 44, 46 of the magnet yoke 16, which border the injection molded section 42.

Further apparent from FIG. 2 are the raised portion 40 and its height. In this exemplary embodiment, the raised portion 40 rises from the bottom wall 18 only to a minimum extent, the height of the raised portion 40 in this exemplary embodiment corresponding to roughly half the thickness of the bottom wall 18 of the housing 12.

The flow cross-section QF is also emphasized (dashed line). The flow cross-section QF is a function of the required distribution of the injection molding compound. The larger the surface area of the cross-section QF of the raised portion or flow aid 40, the larger the amount of injection molding compound that passes through the flow aid 40 during the injection molding process.

Figure 3:
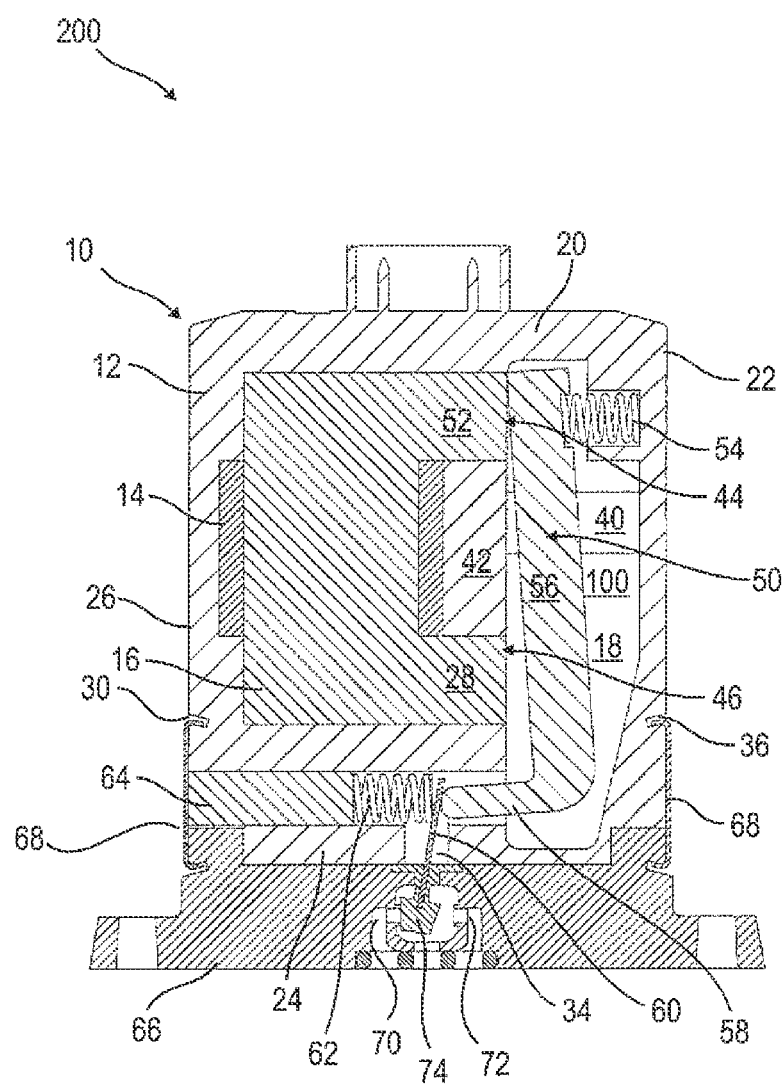
FIG. 3 shows a cross-sectional view of a solenoid valve with a magnetic drive according to an exemplary embodiment of the invention, in the assembled condition.

FIG. 3 shows the magnetic drive 10 in a cross-sectional view analogous to the cross-sectional view of FIG. 1, with FIG. 3 showing the magnetic drive 10 in an installed condition, i.e. the entire solenoid valve 200 can be seen. The solenoid valve 200 thus comprises the magnetic drive 10 (with the housing 12) and a fluid housing 66.

In the completed condition, the magnetic drive 10 includes a magnet armature 50 which contacts the first pole face 44. On the opposite side, the magnet armature 50 is mounted by means of a spring 54 such that the magnet armature 50 is movably arranged inside the cavity 100 of the housing 12. The spring 54 is furthermore supported against the second side wall 22 and is inserted in the spring seat 38.

The magnet armature 50 extends through the cavity 100 of the second section A2, the magnet armature 50 having an L-shaped configuration. Thus, the magnet armature 50 includes a long leg 56 and a short leg 58; in the position shown, it rests against the first pole face 44 by its long leg 56.

The short leg 58 of the magnet armature 50 cooperates with an actuating member 60. The actuating member 60 is in the form of a lever and partly extends into the actuating channel 34.

On the side facing away from the magnet armature 50, the actuating member 60 is acted upon by a spring 62 such that the actuating member 60 pushes the magnet armature 50 to the initial position shown. The spring 62 is supported against a plug 64 here, which is inserted in the plug receiving portion 32.

Moreover, a fluid housing 66 is fastened to the housing 12. The fluid housing 66 is fastened to the housing 12 by means of a pair of brackets 68, the brackets 68 engaging into the first and second indentations 30, 36 of the housing 12.

The fluid housing 66 includes a first valve seat 70 and a second valve seat 72, with the first valve seat 70 being closed by a sealing element 74 in the embodiment shown.

The sealing element 74 is arranged on the actuating member 60 such that the sealing element 74 closes one of the two valve seats 70, 72. In the initial position shown here, the first valve seat 70 is closed by the sealing element 74.

The operating principle of the magnetic drive 10 here is as follows:

A current is conducted through the magnet coil 14, so that a magnetic field builds up, which attracts the magnet armature 50 in particular at the second pole face 46. In this process the force is so high that it overcomes the spring force of the spring 62, so that the short leg 58 of the magnet armature 50 shifts the actuating member 60.

As a result, the sealing element 74 arranged on the actuating member 60 clears the first valve seat 70 and closes the second valve seat 72.

The advantage of the magnetic drive 10 according to the invention resides in the space-saving housing 12, which is formed in one method step of an injection molding method such that the magnet coil 14 is encased in injection molding material and, at the same time, the second section A2 is formed, so that both can be arranged in a housing consisting of the housing 12 and the cover 48.

To this end, at first the magnet coil 14 and the magnet yoke 16 are placed in an injection mold or mold.

Following this, the injection molding compound is introduced into the mold, so that the magnet coil 14 is enclosed by the injection molding compound and, at the same time, the housing 12 is formed, complete with side walls 20 to 26.

The raised portion 40 here allows the injection molded section 42 to be formed such that a sufficient wall thickness of the housing 12 is ensured all over.

After the injection molding compound has cooled down, the further components such as, for example, the magnetic armature 50, can be inserted into the cavity 100 of the housing 12.

Finally, the housing 12 is closed with the cover 48, so that a housing is formed in which the magnet coil 14 is also surrounded by only one wall, as a result of which a correspondingly miniaturized embodiment of a magnetic drive 10 is provided.

Figure 4:
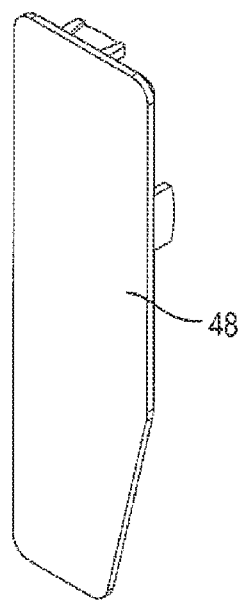
FIG. 4 shows a perspective view of a cover for closing the housing.

A perspective view of the cover 48 is shown in FIG. 4, from which it is apparent that the cover is merely large enough to close the cavity 100 of the second section A2 of the housing 12. More particularly, the cover does not extend into the first section A1, as a result of which the desired reduction in the height H, i.e. the dimension determining the structural size, is achieved.

According to an exemplary embodiment of the invention, the method of manufacturing a magnetic drive may comprise the following steps.

First, the magnet coil 14 along with the magnet yoke 16 is placed in an injection mold (mold). The coil 14 and the yoke 16 may be placed on pedestals which may be used here to provide a distance from the mold, so that a wall made from injection molding compound can be formed also below the coil 14 and the yoke 16. The injection mold or mold has a suitable profile for the manufacture of the housing. In particular, the mold is configured such that the sections A1 and A2 of the housing 12 are formed in one injection molding process.

The mold (injection mold) more particularly has a shape configured to produce the cavity 100 in the second section A2 of the housing 12. In addition, the mold provides a groove or a channel in the form of the flow aid (later the raised portion 40 within the housing). By means of this flow aid, an even and sufficient distribution of the injection molding compound during the injection process is achieved.

In a next step, the injection molding compound is injected into the injection mold (mold), so that, for one thing, the first section for the magnet yoke 16 and the magnet coil 14 is formed from the injection molding compound. At the same time, the second section having the cavity for the magnet armature 50 is formed from the injection molding compound. In particular, by means of the flow aid 40, the injection molded section 42 is sufficiently supplied with injection molding compound; in this way, the coil 14 is uniformly covered from all sides.

In this process, the pedestals on which the coil 14 and the yoke 16 were placed are also encased in injection molding material.

When the injection molding and curing of the housing 12 are completed, the magnet armature 50 and the further components such as, e.g., springs, are installed in the cavity of the second section A2.

Then the second section can be closed with a cover 48.

Figure 5:
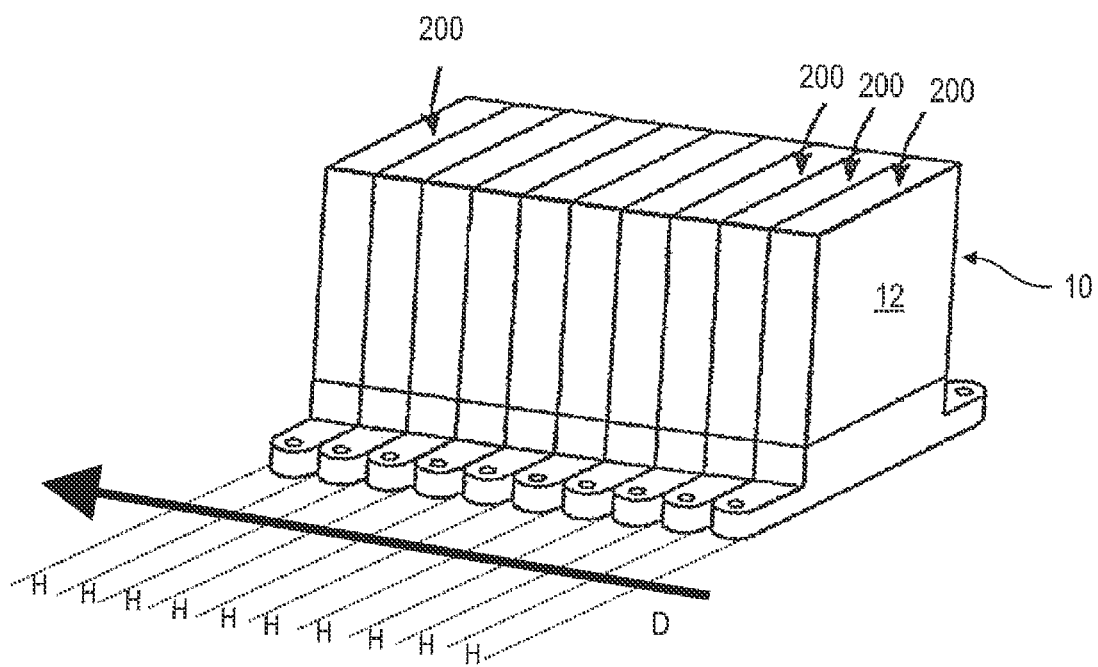
FIG. 5 shows a perspective view of a battery of solenoid valves according to aspects of the invention.

FIG. 5 shows a perspective view of a battery of solenoid valves 200 according to aspects of the invention. Each solenoid valve 200 has a housing 12 according to the preceding aspects of the invention. In the direction D, all of the solenoid valves 200 have the dimension H (the dimension determining the structural size) corresponding to the height H shown in FIG. 2. This dimension H is thus decisive for how tightly the solenoid valves 200 can be packed next to one another. Such batteries may comprise 8, 10 (as in the example illustrated), 16, 32 or more solenoid valves. The grid dimension for the solenoid valves may be in the range between 2.5 mm and 5 mm, preferably 4.5 mm. The maximum height H which a valve may have in the direction D also results from this. Thus, H then also amounts to between 2.5 mm and 5 mm and preferably 4.5 mm. To achieve such tight packings, the housing 12 of each solenoid valve can preferably be configured in accordance with the aspects and exemplary embodiments of the invention, since a double side wall can thereby be dispensed with.

The invention claimed is:

1. A solenoid valve comprising a magnetic drive having a housing which is at least partly formed from an injection molding compound, the magnetic drive including a magnet coil having a winding, a magnet yoke such that injection molding compound covers the magnet coil and the magnet yoke all around except for pole faces of the yoke, and a movably mounted magnet armature which is arranged outside the magnet coil, the housing having a first section which encloses the magnet coil having the winding and the magnet yoke, and the housing having a second section which encloses at least most of the movably mounted magnet armature, wherein the second section includes a cavity for receiving the movably mounted magnet armature and the cavity has an opening on one side for inserting the magnet armature after injection molding of the housing has been completed, wherein the magnet armature includes two pole pieces and the housing includes an injection molded section in the first section, the injection molded section being bordered by the pole pieces and the winding of the magnet coil and filling the area bordered by the pole pieces and the winding, wherein a wall of the cavity has an inwardly facing raised portion extending from the injection molded section along an inner surface of the cavity, wherein the raised portion, serving as a flow aid, allows the injection molded section to be produced between the winding of the magnet coil and the pole pieces relatively centrally within the housing.

2. The solenoid valve according to claim 1, characterized in that the second section is more particularly of a cup-shaped or trough-shaped configuration.

3. The solenoid valve according to claim 1, characterized in that an end of the raised portion serving as a flow aid rests against a wall of the cavity.

4. The solenoid valve according to claim 3, characterized in that the injection molded section has the height of the housing.

5. The solenoid valve according to claim 4, characterized in that the raised portion serving as a flow aid has a cross-sectional area (flow cross-section) which is selected such that the injection molded section is fully formed during the injection molding process.

6. The solenoid valve according to claim 1, characterized in that a cover is provided for closing an opening of the cavity of the second section.

7. The solenoid valve according to claim 6, characterized in that the cover is connected with the housing, in particular adhesively bonded or ultrasonically welded.

8. The solenoid valve according to claim 1, characterized in that it further includes an actuating member having a sealing element for opening a valve seat, the magnet armature cooperating with the actuating member.

9. The solenoid valve according to claim 1, characterized in that the injection molding compound is a thermoplastic material.

10. The solenoid valve according to claim 1, characterized in that the injection molding compound is a material having a high flowability.

11. The solenoid valve according to claim 1, characterized in that the injection molding compound is a liquid crystal polymer (LCP).

12. The solenoid valve according to claim 1, characterized in that the injection molding compound partly penetrates into the winding of the magnet coil.

13. A battery comprising a plurality of solenoid valves according to claim 1.

14. A battery of solenoid valves according to claim 13, wherein an opening of a cavity of at least one solenoid valve is closed by a side wall of an adjacent solenoid valve.

* * * * *